Feb. 8, 1955  A. O. MYROLD ET AL  2,701,596
ROTARY DISK TYPE STRAW CUTTER FOR COMBINES
Filed Aug. 8, 1948  3 Sheets-Sheet 3

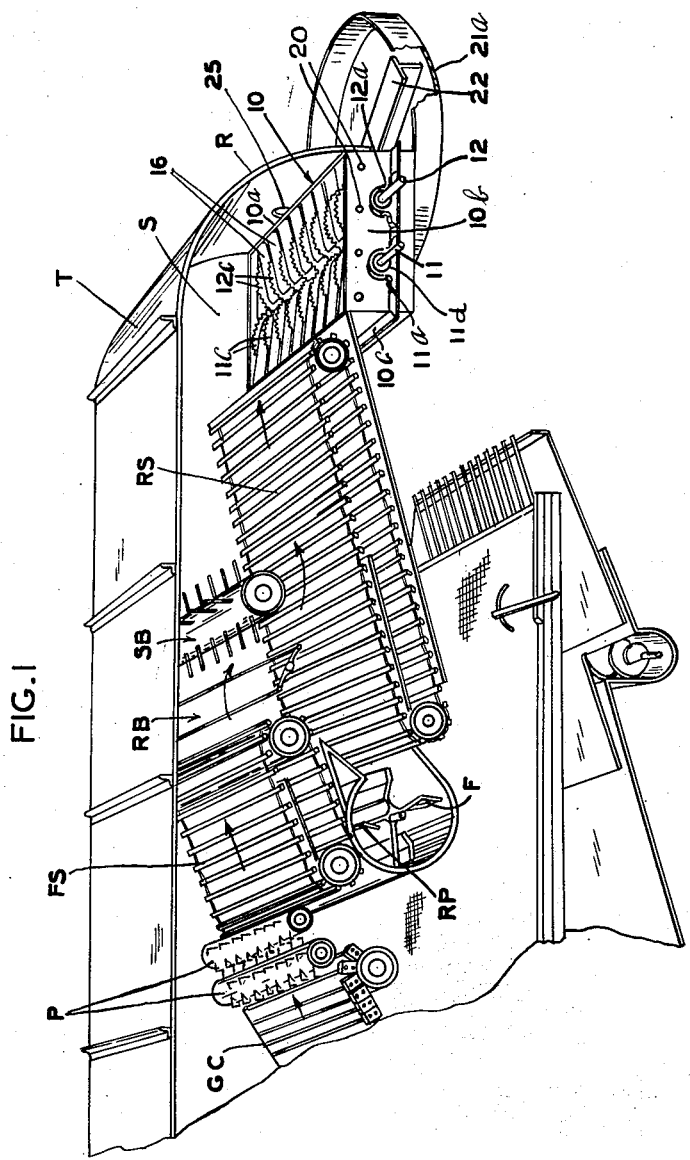

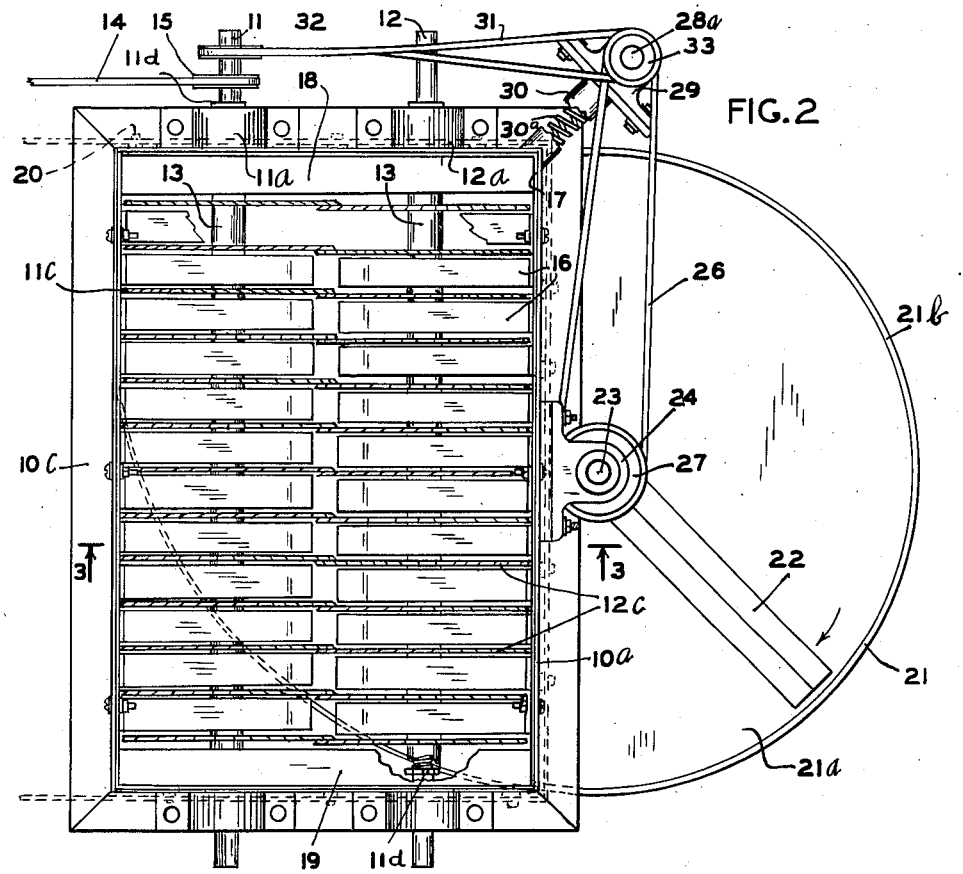
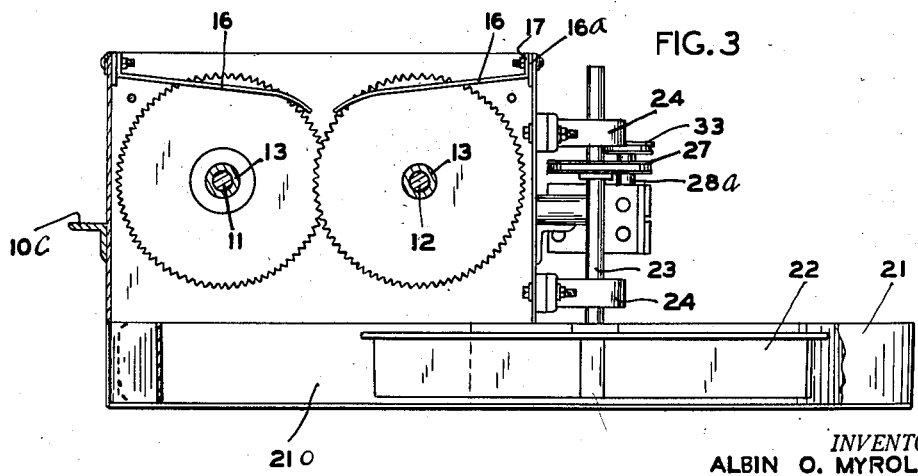

INVENTORS
ALBIN O. MYROLD
GEORGE C. BERGER
BY
ATTORNEYS

United States Patent Office 2,701,596
Patented Feb. 8, 1955

2,701,596

ROTARY DISK TYPE STRAW CUTTER FOR COMBINES

Albin O. Myrold, Crookston, and George C. Berger, Erskine, Minn.

Application August 8, 1949, Serial No. 109,216

4 Claims. (Cl. 146—122)

This invention relates to combines and other harvesting machines which usually remove and separate the grain kernels, fruit or natural food products from the stalks and straw and which normally discharge the stalks from the delivery end of the machine.

Our invention has particular relation to the disintegration and wide scattering of the disintegrated particles of stalks and straw continuously throughout the operation of the machine.

It is an object of our invention to provide a stalk and straw disintegrating and scattering device adapted for use as an attachment or as standard equipment in various harvesting machines such as grain combines, wherein provision is inherently made in the conventional machine for direction and discharge of stalks and/or straw after preliminary handling of crops grown by broadcast or row planting.

Another object is the provision of a stalk and straw disintegrating and scattering machine or attachment adapted to be readily applied to the straw or stalk discharge of conventional combines and the like and adapted in cooperation with the stalk directing facilities of the combine, to cause the stalks and straw to be very finely disintegrated and to thereafter be agitated and centrifugally flung and dispersed over substantial area at the rear of the combine or other harvester.

More specifically, it is an object to provide a device or mechanism of the class described wherein two sets of overlapping, rotary cutter elements work in close cooperation and are revolved in opposite directions with their orbits overlapping in part, to produce a very efficient guiding and disintegration of the stalks and straw into small particles and to further cooperate with additional mechanism for very efficiently and widely dispersing and scattering the disintegrated stalks and straw.

A still further object is the provision of a device and mechanism of the class described which includes in close cooperation with two sets of oppositely revolved, rotary cutter elements, a centrifugal flinging distributor producing fan action and wide dispersion of the particles produced.

These and other objects and advantages of our invention will more fully appear from the following description made in connection with the accompanying drawings wherein like reference characters refer to similar parts throughout the several views and in which:

Fig. 1 is a cut away or sectional perspective view of the rear portion of a conventional grain combine having an embodiment of our invention applied as an attachment to the straw discharge thereof;

Fig. 2 is an enlarged top plan view of the embodiment of our mechanism illustrated in Fig. 1 with the top of the combine casing removed;

Fig. 3 is a cross section taken on the line 3—3 of Fig. 2;

Figure 4:
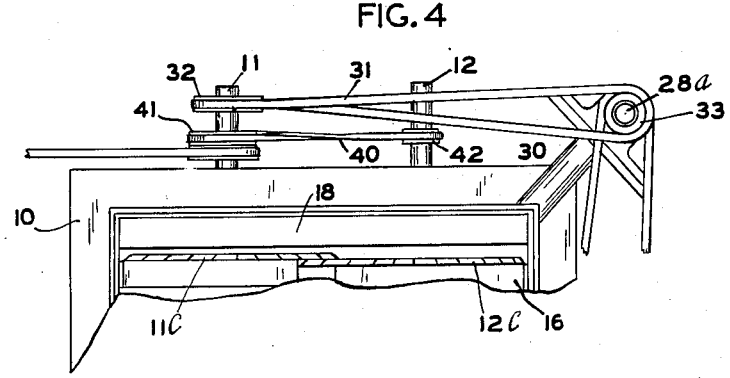
Fig. 4 is a fragmentary top plan view of a somewhat different embodiment (similar to Fig. 2) of our invention.

In Fig. 1, an embodiment of our stalk and straw disintegrating and scattering mechanism as illustrated, is attached to the rear and straw discharge portion of a conventional type of combine, the rear portion of the working mechanism of the combine being shown including the rotating pickers P which engage the whirlwind of fogged straw or stalks riding upwardly over the grain conveyer GC. Rotary pickers P in conventional fashion, act and toss the straw and stalks onto the front straw carrier FS which is inclined rearwardly and which has mounted below to collect the kernels or seeds, a return pan RP of conventional structure. This return pan carries the separated grain to the front of the lower cleaning chute (not shown) of the combine. The straw next passes between a transverse rod beater RB and a rotary spiked beater SB and is dropped through the blast from separating fan F onto the rear straw carrier RS. The various fans employed in the conventional combines and other harvesting machinery move the chaff, stalks and straw rearwardly and the side walls S, top T and outwardly and downwardly curved rear deflecting portions R of the housing of the combine cooperate to forcibly, under normal conditions, discharge straw, chaff and stalks downwardly and rearwardly of the machine.

Referring now to the embodiment of our invention illustrated in Figs. 1 to 3 inclusive, we provide a unit which is well adapted as an attachment to various types of conventional combines and other harvesting machines and which is equally applicable as standard construction in the manufacture of harvesters. As shown, our machine or unit is supported by and mounted in rectangular, open, box-like rigid frame 10 having upstanding front and rear side walls 10a and end walls 10b. The frame as shown, is provided with an out-turned base flange 10c extending about the complete perimeter thereof which, as will be later described, serves as a support for the scattering or distributing mechanism cooperatively associated with the cutter or disintegrating mechanism. The frame 10 with the cutter mechanism mounted therein as shown, is disposed substantially horizontally in the relatively large stalk and straw discharge passage at the rear end of the combine housing. In any event, the cutter mechanism is disposed across or in traversing relation to the natural guided flow of straw from the tail of the combine or other harvesting machine.

A pair of substantially horizontal, spaced cutter shafts 11 and 12 are mounted in parallel relation within frame 10, their outer portions being journaled in suitable bearings 11a and 12a which may be secured to and supported from the out-turned flange 10c of the frame at the ends thereof.

Frictionally clamped or otherwise preferably affixed to shaft 11 are a series or multiplicity of rotary cutter elements 11c preferably in the form of discs having serrated or toothed peripheral edges lying substantially in the plane of the bodies thereof. Small circular saws of suitable diameter having teeth which are not offset from their disc bodies are entirely satisfactory.

As shown in Figs. 1 to 3, the several cutter discs 11c are spaced apart and frictionally clamped together by a series of spacing collars or sleeves 13 which are slidably interposed upon the shaft 11 between the spaced cutter discs and between the terminal discs of the series and suitable abutment collars 11d having threaded engagement with the outer portions of the shafts, one such collar being shown on shaft 11 in Fig. 2.

The cutter shaft 12 has similarly mounted thereon and preferably frictionally affixed thereto, a second series of cooperating cutter discs 12c of preferably but not necessarily similar serrated edge construction to the discs on shaft 12, similar spacing collars 13 being utilized for maintaining the particular spaced relations of the cooperating series of discs 12c.

Here it should be noted that the relationship of the diameters of the two series of discs 11c and 12c and the parallel spacing of the shafts 11 and 12 is such that the peripheral portions of the two series of discs overlap slightly (for example, from one half inch to one and one half inches) at the medial portions of the stalk and straw discharge passage of the combine or harvesting machine and medially between the front and rear side walls and the cooperating cutter disc extend from, or substantially fill the space between, such side walls.

Figure 5:
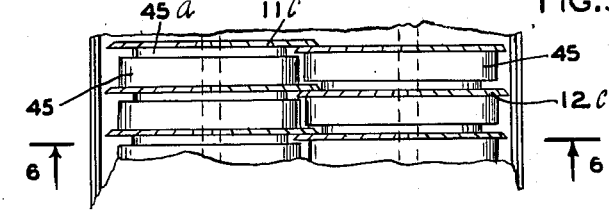
Fig. 5 is a fragmentary top plan view of still another embodiment of our invention.
Figure 6:
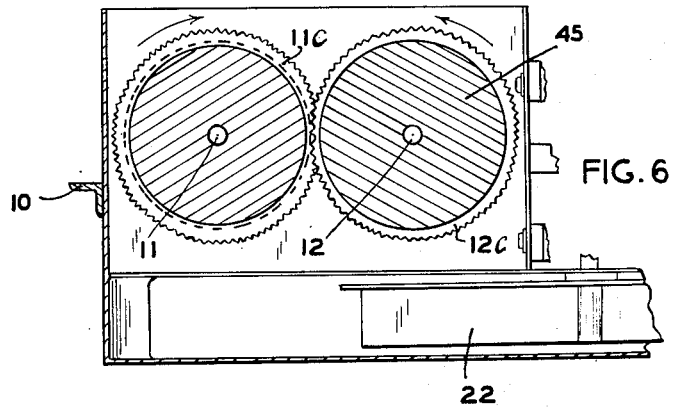
Fig. 6 is a cross section taken on the line 6—6 of Fig. 5.

It further is important in the preferred form of our invention to arrange the cutter discs 11c and 12c on their respective shafts so that the planes of the cooperating discs are disposed in very close working relation either with slight clearance between the discs as shown in Figs. 5 and 6 or with actual frictional contact between the marginal overlapping portions of the two series of discs as shown in Figs. 1 to 3 inclusive.

The two series of cutter discs 11c and 12c are caused to revolve in opposite and inwardly feeding directions and various means for effecting suitable driving connections are known and contemplated. As shown in Figs. 1 to 3, shaft 11 carrying the disc 11c, is positively driven by endless belt 14 connection with one of the rotary shafts of the combine or harvester conveniently adjacent to the tail end of the machine. As shown, endless belt 14 is trained about a driven pulley 15 fixed to one of the ends of shaft 11. Shaft 12 carrying the second series of cutter elements 12c is driven in opposite direction solely by the frictional contact between the overlapping, opposed marginal portions of the two series of discs 11c and 12c, respectively. It has been found that such driving connection is very satisfactory due to the fact that a differential speed of revolution is obtained on the second cooperating series of cutter discs 12c because of the frictional connection means. In another form of the invention illustrated in Fig. 4, both series of cutter discs are positively driven at differential speeds through endless belt driving connections, as will hereafter more fully appear.

The cutter elements of each series are spaced preferably short distances apart, for example, within a range from one half inch to three inches apart. We provide media for preventing passage of straw and stalks and other material downwardly and outwardly between the container of the two series and between the sides and ends of the box-like frame and the terminal cutter elements of both series. To this end, in the form shown in Figs. 1 to 3, a series of resilient stripper plates or fingers 16 which as shown have upturned outer attachment ends 16a, are secured to a transverse bar 17 at each side of the frame extending generally horizontally and slightly downwardly with free ends disposed inwardly of the overlapped relation of the two series of cutter elements. These stripper fingers are of proper width to span the greater portion of the space between successive cutter elements on the related side of the machine. Longitudinal deflector plates 18 and 19 are attached at their outer edges to the end walls 10b of the frame and extend inwardly and downwardly to cover the greater portion of the space between the interior frame ends and the terminal cutters of the two series cooperating and directing straw inwardly for engagement with the rapidly revolving cooperating cutter discs.

Any suitable means may be provided for rigidly securing the said cutter unit to the rigid housing for the combine or harvester, preferably to the two side walls at the rear portions thereof so that the frame and its supported mechanism lies across the natural, relatively large passageway provided for discharge of straw and other material. As shown the two ends of the boxlike frame 10 are provided with a series of bolt-receiving apertures 10d through which nutted bolts 20 may be accommodated, said bolts also extending through suitable apertures appropriately formed in the side walls of the rear of the combine housing. Gasket sleeves, as shown in Fig. 2, are provided between the side walls of the combine housing, said sleeves surrounding the fastening bolts 20 utilized.

Closely associated with the disintegrating or cutter unit and disposed below the same and supported as shown from the flange 10c of the boxlike frame, is a particle-distributor or scattering mechanism of centrifugal fling type, comprising as shown, a rotor casing 21 having a substantially horizontal planar bottom 21a and an upstanding, side wall 21b, a substantial portion of which (nearly half as shown) projects rearwardly and outwardly beyond the rear end of the combine housing and the rear side 10a of the boxlike cutter frame and is uncovered. The forward and remaining portion of housing 21 underlies the greater portion and substantially all of the interlapping portions of the two series of cutter elements and is also open at its top to receive disintegrated straw and stalks and chaff therefrom.

At the right hand side of the combine or other harvesting machine, the rotor housing 21 is provided with a tangentially related relatively large discharge opening 21o disposed in the general manner of the discharge of a centrifugal blower and shown in inside side elevation in Fig. 3.

A rotor, as shown in the form of a diametrically extending T-bar 22 is mounted in rotor housing 21 being as shown fixed to the lower end of a vertical rotor shaft 23 which is journaled in a pair of axially aligned, horizontal thrust bearings 24 fixed to the rear side wall 10a of the box frame, suitable apertures being formed in the rear R of the combine housing for accommodating the bearings and their supporting bases or brackets.

While a single integral diametrically disposed bar 22 is utilized as a rotor, providing a pair of radially extending blades, it will of course be understood that various other constructions of rotors may be used, having a number of radial blades provided the same are adapted to produce a centrifugal fling action in conjunction with the rotor housing 21 and its discharge 21o. Rotor 22 is driven as shown, by belt 26 and pulley 27 connection with a smaller pulley which is fixed to the upper end of a vertical stub shaft 28a suitably journaled in a belt take-up bracket 29. Bracket 29 as shown, is supported from the rear right hand corner of the box frame 10 and the bracket is keyed or otherwise non-rotatively supported on the two section, telescoping support 30 which has interposed between the two sections, a coil spring 30a urging the bracket outwardly for tightening of an endless, twisted belt 31 which is trained about a pulley 32 affixed to the outer end of shaft 11 and also about a pulley 33 fixed to the upper end of the vertical stub shaft 28a.

*Operation*

In use, the fans, various picker mechanism and straw-carrier elements continuously move and direct the straw, stalks and chaff of the crops treated, with agitation, rearwardly of the combine housing and generally in a downward path at the extreme rear of the combine towards the normal straw discharge passage. This principle of stalk carrier mechanism and air circulation rearwardly, upwardly and then downwardly is utilized by substantially all grain combines and many other crop harvester machines for operating upon clover, alfalfa, soy beans and other crops.

Straw or stalks or other material directed to the tail of the machine is thus guided with some force to the medial portion and top of our cutter mechanism. The stripper plates 16 between the various discs of the cutter mechanism substantially prevent wisps of straw and stalks from passing vertically downward between the cutter elements.

The two series of cooperating cutter elements 11c and 12c are revolved at high speed preferably between two thousand and twenty-eight hundred R. P. M. in opposite directions towards the center of the cutter mechanism thereby engaging straw and stalks which drop or are flung against the upper portions of the cutter elements inwardly and generally disposing such material transversely of the cutter elements. The disc-like cutter elements particularly when equipped with serrated or saw edges, feed the straw and stalks efficiently to the interlapping portions of the two series of discs and very efficiently cut such material into very small fragments, the combinative rotary action serving to efficiently eject and force the cut particles downwardly. We prefer to maintain a differential speed relation between the two sets of cutters as it produces a better shearing action than if the cutter elements are all driven at similar speed.

In the form shown in Figs. 1 to 3, the second set 12c of cutter elements are driven solely by frictional contact at their inner marginal portions with the overlapping cutter elements 11c. This frictional contact is very satisfactory because it does not constitute a positive driving and thus, causes the second set 12c of cutter elements to be driven at reduced speed compared to the revolution of cutter elements 11c.

In the operation of the cooperating cutter elements the rotor 22 produces a blower or fan action and since the housing 21 is open at its top, various air currents and eddies are set up both upwardly and downwardly of the cutter mechanism. This produces agitation and turbulence which with the general effect of the fans and carriers of the harvester machine, causes a greater proportion of the straw or stalks to be projected transversely of the top of the disc cutters rather than to normally pass vertically downward.

In the action of the material scattering or distributing mechanism including the rotor 22 and its housing 21, the small particles disintegrated by the cutter mechanism drop and are forcibly fed downwardly by the cutter discs dropping into the portion of the housing therebelow and being whirled around and centrifugally discharged by the rotor 22. A substantial proportion of the disintegrated material is forcibly discharged through the large discharge aperture or opening 21o scattering widely from the right hand side of the machine as shown in a wide, thin stream directed laterally of the machine. A proportion of the particles discharged from the cutter mechanism is agitated and recirculated by the rotor 22 and due to air currents and forward travel of the machine rises above the rear edge of the open housing 21 and is dispersed and scattered behind the machine during operation.

The discharge and subsequent destruction or removal of straw and stalks behind combines and other harvesting machines has been a constant source of trouble to the farmer. In conventional harvesting machines, the straw and stalks are forcibly discharged downwardly forming in effect relatively thick windrows, upon the ground. These windrows cannot well be plowed into the ground but must be picked up and burned or otherwise removed or destroyed. The lengths of straw and stalks discharged from conventional combines and harvesters is also such that it is not adapted to be completely plowed into the ground.

With our improved construction the straw and stalks are cut into very small particles or sections averaging from an inch to three inches in length and are scattered and widely dispersed by the joint action of the elongated slotted discharge opening 21o of our mechanism and the distributing action at the rear of the open top housing 21.

A close combinative relation exists between the cutter mechanism and distributor mechanism not only in the receiving of the disintegrated material and subsequent discharge thereof, but in the production of variable up and down air currents throughout the cutter mechanism and its frame to assist in agitation of the straw and causing the same to be toppled and directed transversely of the discs.

In Fig. 4 of the drawings (a fragmentary top plan view of the right hand end of our cutter mechanism and driving means therefor) another type of driving means for the two series of rotary cutters is illustrated. The box frame 10, shafts 11 and 12, cutter elements 11c and 12c and stripper plates 16 are all identical to the form of the invention previously described. Shaft 11 is driven in identical manner to shaft 11 of the form first described but shaft 12 in Fig. 4 is driven at higher speed than shaft 11 by a twisted endless belt 40 trained about a pulley 41 fixed to shaft 11 and also trained about a smaller pulley 42 fixed to shaft 12.

In Figs. 5 and 6, a somewhat different construction of cutter element, spacers and stripper means is shown. Here, between each adjacent pair of cutter elements on each shaft supporting the two series, a spacer disc 45 of preferably light construction is interposed, having a diameter somewhat less than the diameter of the cutter discs 11c and 12c and each spacer disc has a very short diminished end 45a forming with the juxtaposed cutter discs, an annular groove for accommodation of the periphery and teeth of the cooperating cutter disc of the other series. With this arrangement and construction, the stripper plates 16 of the form first described may be dispensed with and a more efficient exclusion of downwardly moving straw and other material is obtained. The two sets of cutter discs 11c and 12c of the form shown in Figs. 5 and 6 may be driven in accordance with the teachings of either of the forms shown in Figs. 1 to 3 or in Fig. 4.

It will, of course, be understood that various changes may be made in the forms, details, arrangements and proportions of the parts without departing from the scope of our invention.

What we claim is:

1. A straw and stalk disintegrating device for combines having a downwardly directed straw discharge passage, said device comprising in combination a mounting structure having end and side walls adapted to be secured to a combine across the straw and stalk discharge passage thereof, a pair of spaced parallel shafts rotatably mounted on said mounting structure in fixed position relative to each other to extend across the said discharge opening in an elevated position above the ground when said mounting structure is so secured, a series of peripherally toothed rotary disk cutters fixedly mounted in spaced relation on each of said shafts for rotation therewith, the rotary disk cutters of one shaft being substantially parallel with the disk cutters of the adjacent shaft and together extending from one side wall to the other, each of the rotary disk cutters of one shaft being disposed in edge overlapping and side-by-side frictional contacting shearing relation with a rotary disk cutter of the other shaft, mechanism for positively driving one of said shafts and the cutters thereon in one direction, and means for rotating the other rotary disk cutters in the opposite direction and at a different speed from the disk cutters in contacting relation therewith.

2. The invention according to claim 1, with elements supported in the spaces between the disk cutters of each series to prevent passage of straw and stalks between adjacent cutters, the elements between the cutters of each series substantially filling the spaces in the axial direction of the series and the elements of one series each being in aligned relation with an element of the other series, the said elements of one series being in relatively closely spaced relation with the aligned elements of the other series providing a material passage midway between the shafts.

3. The invention according to claim 2, wherein said elements comprise long flat fingers secured to opposite sides of the mounting structure and extending inwardly and downwardly toward the center of the structure.

4. The invention according to claim 2, wherein said elements comprise spacer disks of smaller diameter than the cutting disks.

References Cited in the file of this patent

UNITED STATES PATENTS

| Number | Name | Date |
|---|---|---|
| 21,970 | Lashbrook | Nov. 2, 1858 |
| 181,914 | Croft | Sept. 5, 1876 |
| 239,235 | Flohr | Mar. 22, 1881 |
| 1,006,573 | Lockwood | Oct. 24, 1911 |
| 1,042,932 | Leonard | Oct. 29, 1912 |
| 1,284,068 | Diaz | Nov. 5, 1918 |
| 1,374,149 | Huelves | Apr. 5, 1921 |
| 1,498,086 | Ford | June 17, 1924 |
| 1,769,302 | MacGregor | July 1, 1930 |
| 1,908,548 | Smith | May 9, 1933 |
| 2,239,486 | Edwards | Apr. 22, 1941 |
| 2,280,677 | Wagner et al. | Apr. 21, 1942 |
| 2,281,846 | Klein | May 5, 1942 |